Patented May 25, 1943

2,319,799

UNITED STATES PATENT OFFICE 2,319,799

INTERPOLYMERS OF AN UNSATURATED ALKYD RESIN AND A POLY-(1-HALOGENO-ALLYL) ESTER

Gaetano F. D'Alelio, Pittsfield, Mass., assignor to General Electric Company, a corporation of New York No Drawing. Original application October 31, 1939, Serial No. 302,171. Divided and this application August 22, 1942, Serial No. 455,812

19 Claims. (Cl. 260—42)

This application is a division of my copending application Serial No. 302,171, filed October 31, 1939, and assigned to the same assignee as the present invention.

This invention relates to the production of new materials having valuable and characteristic properties that make them especially suitable for use in industry, for example in molding, laminating, casting, coating and adhesive applications, and for other purposes. The invention is concerned more particularly with compositions of matter comprising an interpolymer (copolymer) or interpolymers of at least one modified or unmodified polyhydric alcohol ester of an alpha unsaturated alpha beta polycarboxylic acid (hereafter for brevity designated generally as an "unsaturated alkyd resin") and at least one poly-(1-halogenoallyl) ester of a non-ethylenic polycarboxylic acid such, for instance, as saturated aliphatic (including saturated cycloaliphatic) and aromatic polycarboxylic acids.

The poly-(1-halogenoallyl) esters of non-ethylenic polycarboxylic acids used in carrying the present invention into effect may be considered as being allyl esters having the graphic formula

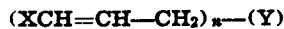

$(XCH=CH-CH_2)_n-(Y)$ where $n$ has a numerical value of at least 2, X is a halogen and Y is a radical of a non-ethylenic polycarboxylic acid (or anhydride thereof if available) containing at least two esterifiable carboxy groups. From the above formula it will be seen that polyesters, the alcohol radicals of which contain the grouping

$XCH=CH-CH_2-$ are embraced by this invention. Illustrative of the non-ethylenic polycarboxylic acids which may be employed in preparing these poly-(1-halogenoallyl) esters, which also may be named poly-(3-halogenoallyl) esters, are the saturated aliphatic polycarboxylic acids such as oxalic, malonic, succinic, adipic, glutaric, pimelic, sebacic, azelaic, suberic, tricarballylic, etc., the cyclic polycarboxylic acids, e. g., the saturated cycloaliphatic polycarboxylic acids such as the cyclopropane dicarboxylic acids, the cyclohexane dicarboxylic acids, the alkyl cycloalkane polycarboxylic acids, etc., and the aromatic polycarboxylic acids such as phthalic, isophthalic, terephthalic, benzoyl phthalic, diphenic and benzophenone-2,4'-dicarboxylic acids, etc., the hydroxy saturated polycarboxylic acids, e. g., citric, tartaric, etc., and similar substances.

The poly-(1-halogenoallyl) esters used in carrying the present invention into effect are, in themselves, relatively inactive polymerizing bodies. If polymerization does occur, the polymers usually are of a low molecular weight, fluid nature and are of limited commercial value. On the other hand, the unsaturated alkyd resins alone are unsuited, even in the presence of polymerization catalysts such as peroxides, for the preparation of practically useful massive bodies. With or without polymerization catalysts, however, they may be applied in film form and, under the influence of heat or light, or heat and light, may be converted in a reasonable time to a cured film. But if effort be made to prepare commercially useful massive bodies from the unsaturated alkyds alone, heat treatment even for 24 hours in the presence of a polymerization catalyst such as super-peroxides usually gives unsuitable materials, that is, they generally lack the properties required for the usual service applications. For example, the cast or molded articles often are soft, rubber masses (even after heat treatment for 24 hours at elevated temperatures) or, if hard bodies, frequently are filled with bubbles or show cracks, or both, when cured.

It was therefore quite surprising and unexpected to find that by copolymerizing a poly-(1-halogenoallyl) ester of a non-ethylenic polycarboxylic acid with an unsaturated alkyd resin, interpolymers were obtained having properties quite different from the properties of the individual components when polymerized under the same conditions. The properties of the interpolymers range, for example, from hard, tough, insoluble and infusible bodies both in film form and when cast or molded in large size to softer, flexible bodies. In general, the properties of these new products are such as to render them suitable for a wide variety of technical applications.

Compositions produced in accordance with this invention also are particularly well adapted for use as "solventless varnishes," for instance as coating compositions and binders in the production of laminated sheets and tapes for use in insulating electrical devices, as well as for other applications.

Another practical advantage accruing from my invention is that the poly-(1-halogenoallyl) esters of nonethylenic polycarboxylic acids are good dispersion mediums for polymerization catalysts such as super-peroxides, which catalysts are dissolved or dispersed in the unsaturated alkyd resins alone only with great difficulty.

In carrying the present invention into effect a polymerizable esterification product of ingredients comprising a polyhydric alcohol and an alpha unsaturated alpha beta polycarboxlic acid is first prepared in accordance with technique now well known to those skilled in the alkyd resin art. Any polyhydric alcohol containing at least two esterfiable aliphatic hydroxyl groups, or mixtures of such alcohols, may be used in preparing the unsaturated alkyd resin. Examples of such polyhydric alcohols are ethylene glycol, di-, tri- and tetra-ethylene glycols, propylene glycol, trimethylene glycol, glycerine, pentaerythritol, etc. Any alpha unsaturated alpha beta polycarboxylic acid, or mixtures of such acids, may be reacted with the polyhydric alcohol or alcohols to form the unsaturated alkyd resin. Examples of such polycarboxylic acids are maleic, monohalomaleic, fumaric, monohalofumaric, citraconic, mesaconic, acetylene dicarboxylic, aconitic, itaconic and its homologues as, for instance, alpha methyl itaconic acid, alpha ethyl itaconic acid, alpha alpha dimethyl itaconic acid, etc. If available, anhydrides of these polycarboxylic acids may be employed.

The terms "polycarboxylic acid" and "dicarboxylic acid," as used generally herein and in the appended claims with reference to non-ethylenic polycarboxylic acids and alpha unsaturated alpha beta polycarboxylic acids, are intended to include within their meaning the anhydrides of such acids.

In some cases, instead of using an unmodified unsaturated alkyd resin I may use a polymerizable unsaturated alkyd resin which has been internally modified by replacing a part, say up to about 75 mol per cent, of the unsaturated polycarboxylic acid with a non-ethylenic polycarboxylic acid, for example a saturated aliphatic polycarboxylic acid such as succinic, adipic, glutaric, pimelic, sebacic, azelaic, suberic, tricarballylic, etc., a cycloaliphatic or an aromatic polycarboxylic acid, e. g., cyclopropane dicarboxylic, cyclohexane dicarboxylic, phthalic, benzoyl phthalic, terephthalic, isophthalic, benzophenone-2,4'-dicarboxylic acids, etc., or with anhydrides of such acids if available.

The term "unsaturated alkyd resin" as used generally herein and in the appended claims is intended to include within its meaning both unmodified esterification products of a polyhydric alcohol with an alpha unsaturated alpha beta-polycarboxylic acid and polymerizable esterification products of the said components which have been modified, for example, as above briefly described.

To achieve copolymerization of the unsaturated alkyd resin with the poly-(1-halogenoallyl) ester, a solution of the said resin in the said ester first preferably is effected. The poly-(1-halogenoallyl) ester also advantageously may act as the carrier for a small amount of a polymerization catalyst. Examples of polymerization catalysts which may be used are ozone, ozonides, inorganic super-oxides such as barium peroxide, sodium peroxide, etc., aliphatic acyl peroxides, e. g., acetyl peroxide, lauryl peroxide, stearyl peroxide, etc., peroxides of the aromatic acid series, e. g., benzoyl peroxide, various per-compounds such as perborates, persulfates, perchlorates, etc., aluminum salts such as the halides, e. g., aluminum chloride, etc., organic and inorganic acids such as methacrylic acid, hydrofluoric acid, etc., metal compounds of the unsaturated acids as, for instance, cobalt and manganese resinates, linoleates, maleates, etc. Benzoyl peroxide is the preferred catalyst. Any suitable amount of catalyst may be used, but in general the catalyst concentration will be within the range of 0.1 to 2.0 per cent by weight of the whole.

When rapidity of interpolymerization between the poly-(1-halogenoallyl) ester and the unsaturated alkyd resin is of secondary importance, copolymerization between these components may be effected merely under the influence of heat, light, or heat and light and in the absence of an accelerator of polymerization. The rate of copolymerization and the properties of the final product vary with the time, temperature and, if a catalyst is used, also with the catalyst concentration. Copolymerization may be effected at from room temperature (20° to 30° C.) to temperatures above 100° C., for example about 130° C., but ordinarily I use temperatures within the range of 60° to 120° C. in causing the mixed components to interpolymerize.

In order that those skilled in the art better may understand how the present invention may be carried into effect, the following example is given by way of illustration. All parts are by weight.

*Example 1*

| | Parts |
|---|---|
| Diethylene glycol maleate* | 90 |
| Di-(1-chloroallyl) succinate | 10 |
| Benzoyl peroxide | 1 |

* NOTE.—The diethylene glycol maleate was prepared by esterifying 147 parts maleic anhydride with 160 parts diethylene glycol. The mixed reactants were heated in a nitrogen atmosphere, the temperature being brought to 190° C. in one hour and held at that temperature for about 3 to 5 hours.

The benzoyl peroxide was dissolved in the di-(1-chloroallyl) succinate, which also may be named di-(3-chloroallyl) succinate, and the resulting solution was mixed with the diethylene glycol maleate. The mixture was then subjected to heat, specifically a temperature of about 85° to 90° C. In about 10 minutes the solution was converted to a hard, insoluble, infusible composition. Heat treatment for 12 hours at 85° to 90° C. gave no visual indication of further interpolymerization between the components. When a small sample of the mixed components was heated on a 130° C. hot plate, it hardened in less than 45 seconds.

Fillers such as alpha cellulose, shredded cellulose derivatives, wood flour, asbestos, paper, cloth, etc., may be impregnated with the mixed unpolymerized or partially polymerized components and the mass hardened under heat or under heat and pressure to yield molded articles of good appearance and physical characteristics.

It will be understood, of course, that my invention is not limited to interpolymerization products of diethylene glycol maleate and the di-(1-chloroallyl) succinate given in the above illustrative example and that instead of using this particular poly-(1-halogenoallyl) succinate, I may use a poly-(1-halogenoallyl) ester of any other non-ethylenic polycarboxylic acid, for example di-(1-halogenoallyl), more particularly di-(1-chloro-, 1-bromo-, 1-fluoro- and 1-iodoallyl), oxalate, malonate, adipate, glutarate, sebacate, azelaate, pimelate, tartrate, phthalate, etc., tri-(1-halogenoallyl) citrate, tricarballylate, etc. Where lightness of color of the copolymer is desirable, the iodo derivatives should be avoided. I prefer to use the chloro derivatives. Instead of using diethylene glycol maleate, I may use any other polymerizable unsaturated alkyd resin, for example glyceryl itaconate, glyceryl maleate, ethylene glycol maleate, ethylene glycol itaconate, esterification products of ethylene glycol, itaconic acid and phthalic anhydride, of glycerine, itaconic acid and phthalic anhydride, of diethylene glycol, itaconic acid and succinic acid, of ethylene glycol, maleic anhydride and succinic acid, of diethylene glycol, maleic anhydride and itaconic acid, of diethylene glycol, maleic anhydride and phthalic anhydride, of glycerine, maleic anhydride and phthalic anhydride, etc. Such modified and unmodified unsaturated alkyd resins are described more fully in my copending application, Serial No. 302,172, filed October 31, 1939, now Patent No. 2,308,494, issued January 19, 1943, and assigned to the same assignee as the present invention.

Also, polymerization catalysts other than benzoyl peroxide may be employed, for instance accelerators of polymerization such as hereinbefore mentioned.

In certain cases, instead of copolymerizing a single poly-(1-halogenoallyl) ester of a non-ethylenic polycarboxylic acid with a single unsaturated alkyd resin, I may copolymerize a plurality of such esters either with a single unsaturated alkyd resin or with a plurality of such resins. In this way it is possible to obtain a composition comprising a mixture of interpolymers best adapted to meet a particular service application.

Although in the foregoing example I have shown an interpolymerization product of a minor proportion (10 to 20 per cent by weight of the mixed components) of a poly-(1-halogenoallyl) ester with a major proportion of an unsaturated alkyd resin, it will be understood, of course, that the invention is not limited to these particular proportions. Mainly for economic reasons I prefer that the poly-(1-halogenoallyl) ester does not exceed substantially 50 per cent by weight of the mixed materials, but the use of higher amounts is not precluded, as for example up to, say, 60 or 65 per cent by weight of the whole. The incorporation of a small amount, e. g., 1 or 2 per cent, of a poly-(1-halogenoallyl) ester of a non-ethylenic polycarboxylic acid has a beneficial effect upon such alkyd resins, yielding products of improved properties as compared with unsaturated alkyd resins that have been polymerized in the absence of such poly-(1-halogenoallyl) esters. However, somewhat better results are obtained when the said ester constitutes at least 5 per cent, by weight, of the mixed starting components. In general, the proportions will be varied depending upon the particular properties desired in the interpolymer.

The interpolymerization products of this invention have a wide range of properties. Depending, for example, upon the particular poly-(1-halogenoallyl) ester and the particular unsaturated alkyd resin employed, the particular proportions thereof, the particular conditions of polymerization and the extent of the interpolymerization, they vary from soft, flexible, soluble bodies to hard, rigid masses of varying resistance to solvents. In intermediate stages of copolymerization some form fluid compositions of varying intrinsic viscosities and may be so used. For coating and impregnating applications where the presence of a small amount of solvent in the cured composition is not objectionable, the mixed starting components may be diluted with volatile or non-volatile solvents to viscosities best adapted to meet the particular service application, and then may be copolymerized after application of the solution to the particular article to be coated or impregnated. By suitable selection of the starting materials and the conditions of interpolymerization, interpolymers can be obtained in an insoluble, infusible state practically resistant to the destructive effect of other chemical bodies such as acids, bases, solvents and the like.

These new interpolymers may be used alone or with fillers or other modifying agents, for example in casting, molding and laminating applications, as adhesives, impregnants and surface coating materials. They may be used as impregnants for many porous bodies, such as cork, pottery, felts or fabricated bodies with interstices, e. g., the windings of electrical coils, netted fiber, interwoven fibrous materials, etc. They also may be used for protectively coating impervious articles such as metals, or for coating or coating and impregnating articles such as paper, wood, cloth, glass fibers, concrete, synthetic boards, etc. They also may be employed in the production of wire enamels and winding tapes. The mixed components or partial interpolymers thereof, with or without modifying agents, may be cast and molded under heat or under heat and pressure. They also may be molded by injection, extrusion or compression molding technique whereby they are heat-and-pressure-hardened to yield molded articles of manufacture for various industrial, household and novelty uses.

What I claim as new and desire to secure by Letters Patent of the United States is:

1. A polymerizable composition comprising (1) a polymerizable unsaturated alkyd resin, (2) a poly-(1-halogenoallyl) ester of a polycarboxylic acid selected from the class consisting of saturated aliphatic polycarboxylic acids and aromatic polycarboxylic acids, said poly-(1-halogenoallyl) ester constituting from 1 to 65 per cent by weight of the mixed components of (1) and (2), and (3) a catalyst for accelerating the copolymerization of the said mixed components.

2. The polymerized composition of claim 1.

3. A composition comprising the product of polymerization of a mixture of copolymerizable materials comprising (1) a polymerizable esterification product of a polyhydric alcohol, an alpha unsaturated alpha beta polycarboxylic acid and a polycarboxylic acid selected from the class consisting of saturated aliphatic polycarboxylic acids and aromatic polycarboxylic acids and (2) a poly-(1-halogenoallyl) ester of a polycarboxylic acid selected from the class consisting of saturated aliphatic polycarboxylic acids and aromatic polycarboxylic acids, said poly-(1-halogenoallyl) ester constituting from 1 to 65 per cent by weight of the mixed components of (1) and (2).

4. A composition comprising the product of polymerization of a mixture comprising (1) a polymerizable unsaturated alkyd resin obtained by reaction of ingredients comprising a dihydric alcohol and an alpha unsaturated alpha beta dicarboxylic acid and (2) a poly-(1-halogenoallyl) ester of a polycarboxylic acid selected from the class consisting of saturated aliphatic polycarboxylic acids and aromatic polycarboxylic acids, said poly-(1-halogenoallyl) ester constituting from 1 to 65 per cent by weight of the mixed components of (1) and (2).

5. A composition containing the product of polymerization of a mixture of copolymerizable materials comprising (1) an unsaturated alkyd resin and (2) a poly-(1-halogenoallyl) ester of an aromatic polycarboxylic acid, said poly-(1-halogenoallyl) ester constituting from 5 to 50 per cent by weight of the mixed components of (1) and (2).

6. A composition comprising the product of polymerization of a mixture including (1) a polymerizable unsaturated alkyd resin obtained by reaction of a mass comprising essentially a polyhydric alcohol and an alpha unsaturated alpha beta polycarboxylic acid and (2) a poly-(1-chloroallyl) ester of an aromatic polycarboxylic acid, said poly-(1-chloroallyl) ester constituting from 5 to 50 per cent by weight of the mixed components of (1) and (2).

7. A composition comprising the product of polymerization of a mixture comprising (1) a polymerizable unsaturated alkyd resin obtained by reaction of ingredients comprising a dihydric alcohol and an alpha unsaturated alpha beta dicarboxylic acid and (2) a poly-(1-chloroallyl) ester of an aromatic polycarboxylic acid, said poly-(1-chloroallyl) ester constituting from 5 to 50 per cent by weight of the mixed components of (1) and (2).

8. A composition containing the product of polymerization of a mixture of copolymerizable materials comprising (1) an unsaturated alkyd resin and (2) a poly-(1-halogenoallyl) ester of a saturated aliphatic polycarboxylic acid, said poly-(1-halogenoallyl) ester constituting from 5 to 50 per cent by weight of the mixed components of (1) and (2).

9. A composition comprising the product of polymerization of a mixture including (1) a polymerizable unsaturated alkyd resin obtained by reaction of a mass comprising essentially a polyhydric alcohol and an alpha unsaturated alpha beta polycarboxylic acid and (2) a poly-(1-chloroallyl) ester of a saturated aliphatic polycarboxylic acid, said poly-(1-chloroallyl) ester constituting from 5 to 50 per cent by weight of the mixed components of (1) and (2).

10. A composition comprising the product of polymerization of a mixture comprising (1) a polymerizable unsaturated alkyd resin obtained by reaction of ingredients comprising a dihydric alcohol and an alpha unsaturated alpha beta dicarboxylic acid and (2) a poly-(1-chloroallyl) ester of a saturated aliphatic polycarboxylic acid, said poly-(1-chloroallyl) ester constituting from 5 to 50 per cent by weight of the mixed components of (1) and (2).

11. A product comprising an interpolymer of (1) a polymerizable unsaturated alkyd resin and (2) a succinic di-ester of 1-chloroallyl alcohol in an amount corresponding to from 5 to 50 per cent by weight of the mixed components of (1) and (2).

12. A product comprising an interpolymer of (1) a polymerizable unsaturated alkyd resin and (2) an adipic di-ester of 1-chloroallyl alcohol in an amount corresponding to from 5 to 50 per cent by weight of the mixed components of (1) and (2).

13. A product comprising an interpolymer of (1) a polymerizable unsaturated alkyd resin and (2) a phthalic di-ester of 1-chloroallyl alcohol in an amount corresponding to from 5 to 50 per cent by weight of the mixed components of (1) and (2).

14. A composition comprising the product of polymerization of a mixture comprising (1) a polymerizable unsaturated alkyd resin obtained by reaction of ingredients comprising a dihydric alcohol and an alpha unsaturated alpha beta dicarboxylic acid and (2) a phthalic di-ester of 1-chloroallyl alcohol in an amount corresponding to from 5 to 50 per cent by weight of the mixed components of (1) and (2).

15. As a new product, an interpolymer resulting from the polymerization of a mixture of (1) a polymerizable maleic ester of a polyhydric alcohol and (2) a phthalic di-ester of 1-chloroallyl alcohol, said di-ester constituting from 5 to 50 per cent by weight of the mixed components of (1) and (2).

16. A composition comprising the product of polymerization of a mixture comprising (1) a polymerizable maleic ester of a dihydric alcohol and (2) a phthalic di-ester of 1-chloroallyl alcohol in an amount corresponding to from 5 to 50 per cent by weight of the mixed components of (1) and (2).

17. A composition comprising an interpolymer of (1) di-ethylene glycol maleate and (2) a phthalic di-ester of 1-chloroallyl alcohol in an amount corresponding to from 5 to 50 per cent by weight of the mixed components of (1) and (2).

18. A composition comprising an interpolymer of (1) di-ethylene glycol maleate and (2) a succinic di-ester of 1-chloroallyl alcohol in an amount corresponding to from 5 to 50 per cent by weight of the mixed components of (1) and (2).

19. The method of producing a new synthetic composition which comprises (1) forming a polymerizable composition comprising (a) a polymerizable unsaturated alkyd resin, (b) a poly-(1-halogenoallyl) ester of a polycarboxylic acid selected from the class consisting of saturated aliphatic polycarboxylic acids and aromatic polycarboxylic acids, said poly-(1-halogenoallyl) ester constituting from 1 to 65 per cent by weight of the mixed components of (a) and (b), and (c) a catalyst for accelerating the copolymerization of the said mixed components, and (2) polymerizing the said polymerizable composition to form an interpolymer of the said unsaturated alkyd resin and poly-(1-halogenoallyl) ester.

GAETANO F. D'ALELIO.